United States Patent [19]

Faure et al.

[11] Patent Number: 4,457,770
[45] Date of Patent: Jul. 3, 1984

[54] METHOD AND APPARATUS FOR THE PRODUCTION OF OPTICAL FIBERS WITH LATERAL GASEOUS INJECTION

[75] Inventors: Michel Faure; Yves Lumineau; André Jouanin, all of Conflans-Ste-Honorine, France.

[73] Assignee: Lignes Telegraphiques & Telephoniques, Honorine, France

[21] Appl. No.: 364,251

[22] Filed: Apr. 1, 1982

[30] Foreign Application Priority Data

Apr. 8, 1981 [FR] France ................... 81 07038

[51] Int. Cl.³ .......................................... C03B 37/025
[52] U.S. Cl. .......................................... 65/3.12; 65/13
[58] Field of Search ............... 65/144, 157, 3.12, 18.2, 65/13; 427/163, 231, 237; 118/720, 725, 730

[56] References Cited

U.S. PATENT DOCUMENTS

| | | | |
|---|---|---|---|
| 4,117,802 | 10/1978 | Le Sergent et al. | 65/3.12 X |
| 4,155,733 | 5/1979 | Sandbank et al. | 65/3.12 |
| 4,312,654 | 1/1982 | Sarkar | 65/3.12 |

FOREIGN PATENT DOCUMENTS 2266668 10/1975 France .
52-71249 6/1977 Japan .

Primary Examiner—Richard V. Fisher
Attorney, Agent, or Firm—Roland Plottel

[57] ABSTRACT

The invention relates to an apparatus for producing a preform for constituting an optical fiber. This apparatus essentially comprises a glass maker's lathe and a motor which holds and rotates a hollow silica tube, a torch making it possible to heat a cross-section of the tube and which can be translated along the tube and means for supplying the gaseous compounds consisting of silicon chloride, oxygen and doping agents decomposing under the action of the heat. Part of the products obtained is deposited on the walls of the tube. The supply means comprise a pipe entering the tube in axial manner and at the end of which are provided two radially directed arms, which terminate with an outlet normal to the pipe and arm, said pipe moving in translation integrally with the torch.

9 Claims, 1 Drawing Figure

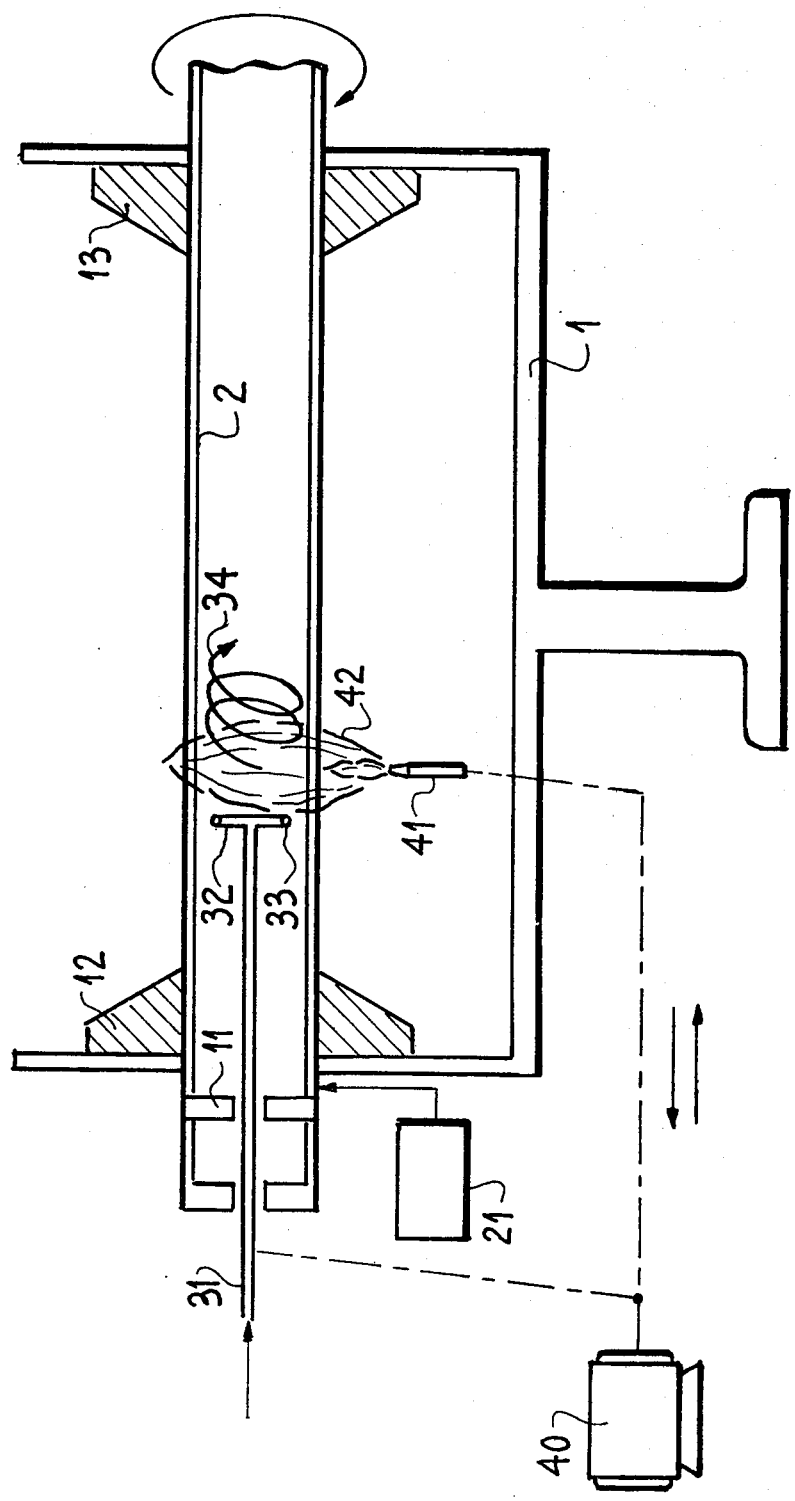

METHOD AND APPARATUS FOR THE PRODUCTION OF OPTICAL FIBERS WITH LATERAL GASEOUS INJECTION

BACKGROUND OF THE INVENTION

The present invention relates to the production of optical fibers and more specifically to an improvement made to the injection of the gases used during this production process.

The term optical fiber is generally understood to mean a light wave guide which, in its simplest form, consists of at least two layers of glass. One layer forms the core of the fiber and the other forms the fiber cladding and is placed round the core, whilst having a refractive index below that of the core. In certain applications, it is known to use a fiber in which the index varies radially in a continuous or discrete manner from a higher value at the centre to a lower value at the periphery.

Various processes are known for the production of such graded-index fibers and they generally consist of three fundamental steps:

the production of a solid glass cylinder, called the preform, whose index varies discretely or continuously from the centre towards the periphery;

fiber formation, i.e. the drawing out of the preform in order to obtain a greater fiber length, whose diameter is well below that of the preform; and the protection of the thus obtained fibers and their insertion into cable structures.

A number of different processes for producing the preform are also known and in particular a vapour phase deposition process known under the initials M.C.V.D. (modified chemical vapour deposition) making it possible to obtain high quality graded index fibers. This process consists of using a hollow cylindrical silica tube traversed by a gaseous stream of silicon chloride, oxygen and a certain number of compounds (generally halides) of materials for doping the silica, in order to vary its index. The tube is externally and locally heating to bring about an oxidation of the gases and the deposition and vitrification of the products of the reaction within the tube and specifically at the heated point. The heating zone is moved at constant speed along the tube. As the thickness of the deposit obtained during each passage is very low, numerous passages (roughly at least 100) are required, bearing in mind that for each of these processes it is necessary to vary the concentrations of the doping gases in order to obtain a variation of the index between successive layers. Then the tube is collapsed to form the preform.

It is therefore readily apparent that the process is slow and as a result of the heating point being displaced along the tube, it is necessary to wait until the tube temperature is sufficiently high for the chemical reaction to be started in the following zone, whilst in addition the efficiency of the process is very poor. It has in fact been estimated that between 70 and 75% of the products of the reaction are entrained towards the outlet of the tube, whilst only about 25% of these products are deposited on the tube walls.

BRIEF SUMMARY OF THE INVENTION

The present invention relates to an improvement to the apparatus for performing the above process making it possible to improve the efficiency of the process and speeding up the production of the preform.

Therefore, the present invention relates to an apparatus for the production of optical fibers comprising means for holding and rotating a tube, means for heating a cross-section of said tube and which can be moved along the exterior of the tube and means for supplying gaseous compounds, which can decompose under the effect of the heating means, whereby at least part of the products obtained are deposited on the inner wall of the tube, wherein the supply means comprise at least one injector positioned laterally with respect to the tube axis.

DESCRIPTION OF THE DRAWINGS AND PREFERRED EMBODIMENTS

The invention is described in exemplified manner hereinafter with reference to the attached drawing, which shows a diagrammatic sectional view of the apparatus according to the invention.

The drawing shows a glass maker's lathe 1 in which is held an e.g. silica hollow tube 2 by means of two jaws 12, 13 at each of its ends. Tube 2 is rotated at a constant speed by a motor 21. As described hereinbefore, it is externally heated along its cross-section by a torch 41, which forms a flame 42 around tube 2. Torch 41 is displaced in translation along the axis of the tube by a motor 40.

At one of its ends (left in the drawing) the tube 2 is sealed by a tight, sliding joint 11 traversed by the pipe 31 for supplying the gases, namely silicon chloride, oxygen and doping compositions. The other end of the tube, not shown in the drawing, is open to the air and is followed by a device for recovering the unoxidized gases. The gaseous stream circulates from left to right in the diagram.

According to the invention, the gas supply pipe 31 axially traversing joint 11 in per se known manner, is terminated by at least one radial arm 32 enabling the lateral injection of the gas into the tube 2. As the tube is rotated, the injected gas is exposed to a vertical or whirling path. Moreover, it is preferable for the injector to form the same translation movement as torch 41, the former being positioned slightly upstream of the latter, in order that the gaseous outflow continues to be in vortex form at the torch.

According to an embodiment shown in the drawing, the injector comprises two radial arms 32, i.e. they are normal to the axial pipe 31 and form extensions of one another. Each of them ends with an outlet 33 forming an angle between 0° and 90° with arm 32 and preferably perpendicular to supply pipe 31 and to arms 32.

According to a variant, the injector can turn around pipe 31.

It was discovered during tests performed by the Applicants that such an injector makes it possible to significantly limit the percentage of products of the chemical reaction entrained by the gaseous stream towards the tube outlet, without being deposited on the side walls. Thus, the use of this injector makes it possible to reduce the time taken by the aforementioned process, either by increasing the translation speed of the torch 41 essentially in a ratio of 1 to 2 in the case where it is desired to obtain successive layers of the same thickness as in the prior art, or to reduce the passage numbers necessary for the torch along the tube. In the latter case, the successive layers obtained are thicker. It should be noted that in the latter case it is necessary to add to the gas supplied by pipe 31, a certain proportion of helium, which prevents the formation of harmful oxygen bubbles.

Moreover, the distribution of the gases in the tube is improved, so that it is possible to increase the diameter of tube 2 without the production efficiency dropping below a critical threshold, which makes it possible to obtain larger diameter preforms and consequently improve the efficiency of the process.

Finally, this structure is of particular interest in the case when a plasma deposition process is used, because the helical path of the gases close to the tube wall makes it possible to confine the plasma in the centre of the tube and consequently prevents any dangers of electric arcs between the plasma and the inductance coil surrounding the tube.

What is claimed is:

1. A method for the production of optical fiber preforms comprising, rotating a tube, heating a cross-section of said tube, supplying glass-forming gaseous compounds, which can decompose under the effect of said heating, whereby at least part of the products obtained are deposited on the inner walls of the tube, said supplying comprising directing said gaseous compounds toward said tube at an angle $>0°$ and $\leq 90°$ with respect to an axis radial to the tube axis in a vortex whirling path along the inner wall of said tube into said heated cross-section.

2. An apparatus for the production of optical fiber preforms, comprising means for holding and rotating a tube; means for heating a cross-section of said tube and which can be moved along the exterior of the tube; and means for supplying gaseous compounds, which can decompose under the effect of said heating means, whereby at least part of the products obtained by said decomposition are deposited on the inner wall of the tube; wherein said supply means comprises at least one injector means positioned laterally with respect to the tube axis, for directing said gaseous compounds in vortex form in a whirling path along the inner wall of said tube wherein said supply means enter said tube axially by means of a pipe having at its end injector means comprising two radially extending arms, each arm being terminated at an outlet forming an angle $>0°$ and $\leq 90°$ with its supporting arm.

3. An apparatus according to claim 2, wherein each of said outlets is normal both to said pipe and its supporting arm.

4. An apparatus for the production of optical fiber preforms, comprising means for holding and rotating a tube; means for heating a cross-section of said tube and which can be moved along the exterior of the tube; and means for supplying gaseous compounds, which can decompose under the effect of said heating means, whereby at least part of the products obtained by said decomposition are deposited on the inner wall of the tube; wherein said supply means comprises at least one injector means positioned laterally with respect to the tube axis, for directing said gaseous compounds in vortex form in a whirling path along the inner wall of said tube wherein said injector means comprises an arm having an outlet extending laterally from said tube axis for directing said gaseous compound toward said inner wall and said outlet pointing in a direction forming an angle $>0°$ and $\leq 90°$ with respect to an axis radial to said tube axis.

5. An apparatus according to claim 4, including means for moving said supply means along the tube with the same axial movement as said heating means.

6. An apparatus according to claim 4 wherein said outlet is normal both to said tube and arm axis.

7. An apparatus according to claim 4 wherein said injector means is rotatably mounted about said tube axis.

8. An apparatus according to claim 4 wherein said injector means is positioned upstream from said heating means in order that the gaseous outflow is in a vortex form at said heated cross section.

9. An apparatus according to claim 4 including means for mounting said injector means for movement along said tube, and said movement includes axial movement coordinated with said heating means movement.

* * * * *